Figure 1:
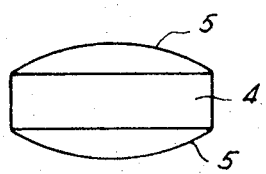
Figure 2:
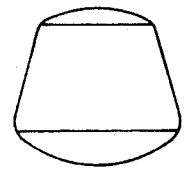
Figure 3:
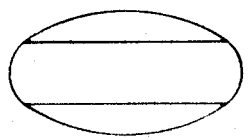
Figure 4:
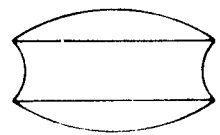
Figure 5:
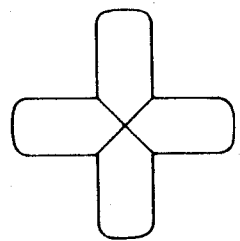

United States Patent [19]
Rio

[11] 3,767,367
[45] Oct. 23, 1973

[54] INDIVIDUAL RESPIRATORS CONTAINING COMPOSITIONS BASED ON POTASSIUM SUPEROXIDE

[75] Inventor: Michel Rio, Elancourt, France

[73] Assignee: L'Air Liquide, Societe Anonyme pour L'Etude et L'Exploitation des Procedes Georges Claude, Paris, France

[22] Filed: Nov. 29, 1971

[21] Appl. No.: 202,933

[30] Foreign Application Priority Data
Dec. 2, 1970 France .................................. 7043332

[52] U.S. Cl. ................................... 23/281, 128/142
[51] Int. Cl. ............................................... B01j 7/00
[58] Field of Search ....................... 23/281; 128/142, 128/142.2, 142.3; 423/579; 102/39, 99, 105

[56] References Cited
UNITED STATES PATENTS

| 3,443,906 | 5/1969 | McGoff et al. ......................... 23/281 |
| 2,517,209 | 8/1950 | Jackson et al. ......................... 23/281 |
| 1,596,060 | 8/1926 | Mase .............................. 23/281 UX |
| 2,389,225 | 11/1945 | Wieczorek et al. ............. 23/281 UX |
| 2,494,131 | 1/1950 | Jackson et al. ......................... 23/281 |
| 2,889,210 | 6/1959 | Bovard ................................... 23/281 |
| 2,913,317 | 11/1959 | Bovard ................................... 23/281 |
| 3,148,034 | 9/1964 | Bovard et al. ......................... 23/281 |
| 3,403,981 | 10/1968 | Lemcke et al. ......................... 23/281 |
| 3,574,561 | 4/1971 | McKerson et al. ............. 423/579 X |
| 3,655,346 | 4/1972 | Cotabish et al. ....................... 23/281 |

Primary Examiner—Morris O. Wolk
Assistant Examiner—D. G. Millman
Attorney—Alvin Browdy et al.

[57] ABSTRACT

A cartridge for the regeneration of expired gases, which cartridge is adapted to be incorporated in an individual closed-circuit respirator, contains compositions based on potassium superoxide conditioned by the pelleting of the potassium superoxide powder to provide a geometrical and/or polygonal shape having at least some convex faces.

10 Claims, 6 Drawing Figures

INDIVIDUAL RESPIRATORS CONTAINING COMPOSITIONS BASED ON POTASSIUM SUPEROXIDE

The present invention relates to the regeneration of the atmosphere in individual closed circuit respirators containing compositions based on potassium superoxide.

Potassium superoxide is a useful product for the regeneration of expired gases, since it affords a possibility for liberating oxygen and fixing the carbon dioxide. Such regeneration is based on a chemical process involving heterogeneous phases, i.e. solid and gaseous phases. In order that this heterogeneous phase reaction may take place under good conditions (i.e. quantitatively) it is conventional practice to effect considerable division of the solid (i.e. a fluidised bed) so as to increase and renew the solid/gas contact surface. It has been found that this process is not suitable for the regeneration of the potassium superoxide expired gases for numerous reasons.

According to one of the oldest known techniques, the potassium superoxide is prepared by combustion of the metal potassium in a mixture of oxygen and nitrogen. This process produces a powder in the form of a downy and extremely light "snow" which is incapable of flowing. In order to permit easier manipulation, the downy powder is subjected to compacting/rolling to obtain scales or flakes which are then compressed in the form of large cakes having a diameter of approximately 20 centimetres and a thickness of the order of 10 centimetres. These cakes are then crushed to the form of granules which are screened. All these operations are effected under an adjusted-humidity atmosphere.

This process has the disadvantage that it yields a product of heterogeneous compression. It will readily be appreciated that the distribution of the pressure within such a solid is necessarily heterogeneous, this being increasingly so in proportion as the volume becomes greater, when scales or flakes are compressed in order to produce large cakes. The granules prepared by this technique are seen to exhibit differences in colour which are symptomatic of compression heterogeneity.

Such compression heterogeneity results in heterogeneity of the solid/gas reactions.

Endeavors have been made to find a mode of processing potassium superoxide which will yield improved distribution of the pressures and, consequently, a higher degree of homogeneity in the gas/solid reactions.

This novel mode of processing makes it possible to obtain punctiform contact between the novel $KO_2$ compositions and to provide between them uniform interstices promoting homogeneous distribution of the gas to be regenerated.

On the other hand, it is known that in order to cause a solid to react with a gas under good conditions, it is necessary to provide for porosity.

Commercially available granules exhibit a relatively low degree of porosity, substantially lower than 40 percent, of the order of 37 percent, and their density is detrimental to solid/gas contact and, consequently, to satisfactory reactivity.

It has been discovered that the potassium superoxide obtained in powder form in accordance with the technique disclosed in French specification No. 1,460,714 of Sept. 29, 1965, in the name of the present applicants, permits the processing of potassium superoxide and the obtaining of pellets or "pastilles" having calibrated dimensions.

A compromise has been found between the forms which it is possible to produce by pelleting and those which afford the largest surface relative to volume, whilst at the same time taking account of the smegmatic or detersive state of $KO_2$, similar to that of soap, the tendency to adhesion of which does not permit the production of some shapes.

It has been discovered that any $KO_2$ composition of curved and/or polygonal geometrical shape having at least some convex faces permits the achievement of a large surface and of punctiform contacts and is particularly suitable for the regeneration of atmosphere.

The shapes shown by way of example in FIGS. 1 to 5 of the accompanying drawing, such as frustoconical shape, star-shape, "diabolo" shape, a shape involving a cylindrical body with curved end faces, etc., having at least some convex faces, are interesting. They may be obtained by pelleting whilst at the same time permitting the provision of punctiform contact and limiting to a minimum those zones which are sterile with regard to the reactions of the gas to be regenerated.

The preferred composition is processed into the form of a pellet or "pastille" of $KO_2$ comprising a cylindrical body and two curved end faces having a radius of curvature substantially equal to the diameter of the pellet.

Such conditioning by pelleting, pastilling, into geometrically curved and/or polygonal shape having at least some convex faces permits the production of pellets having a good homogeneous clear yellow colour, this being an index for homogeneous distribution of the pressures within the solid.

Preferably, the potassium superoxide $KO_2$ is processed according to the invention in the form of pastilles having a diameter of 7 to 10 mm and a thickness of 4 to 6 mm.

The pelleting is particularly advantageous in the case of potassium superoxide, such processing permitting the fine regulation of the porosity.

A degree of porosity of 40 to 50 percent is advantageous; below this, $KO_2$ pellets are too compact and above this porosity the pellets lose their individuality and promote the formation of enormous preferential channels hindering the reactions between the gases to be regenerated and the $KO_2$. A degree of porosity of 43 to 47 percent is particularly useful.

A porosity such as defined between 40 and 50 percent affords an excellent compromise between the desired degree of reactivity between $KO_2$ and the gases to be exhibited by the $KO_2$ shapes processed by pelleting as a function of the stresses to which they are subjected in aeronautic and submarine application.

It is been found that the addition of catalysers promotes the reactions between the gases to be regenerated and the potassium superoxide and optimises the $KO_2$ performance. Such catalyst is preferably a compound of copper, such as copper oxychloride. The $KO_2$ shapes obtained by pelleting according to the invention contain between 0.10 and 0.30 percent of copper oxychloride and in particular 0.15 percent of $3CuO, CuCl_2, 3H_2O$. The various $KO_2$ pellet shapes according to the invention are obtained from the pulverulent powder prepared in accordance with the said French Specification N°. 1,460,714. According to the technique of that specification, the hydrogen peroxide is reacted in a concentrated solution on potassium hydroxide. The hydrogen peroxide is dosed, in the dispersed state, into an organic medium which is inert relative to the reagents involved and does not dissolve them, such as a halogenated hydrocarbide, the aqueous phase is separated, and then the potassium superoxide is prepared therefrom by atomisation and drying. In some cases, the reaction of $H_2O_2$ on KOH and the drying of the $KO_2$ are effected under an inert gas atmosphere.

The process for the preparation of $KO_2$ according to the technique of the Applicants results in the obtaining of a powder having adequate flow properties and a suitable apparent density permitting shaping by pelleting.

The ability of the powder to flow makes it possible to fill the pelleting matrix solely with the aid of a hopper or funnel to which vibrations are imparted. Compression is then effected under a relatively low pressure. It has been found that compression of the order of 80 to 120 kg/cm² is particularly adapted to the smegmatic condition of the potassium superoxide and yields interesting results.

A $KO_2$ powder of apparent density ranging between 0.35 and 0.45 is very suitable for pelleting.

Before carrying manufacture by pelleting into effect, a double identification test is effected in order to ascertain the apparent density and to determine the porosity.

So as to prevent any adhesion of the $KO_2$, the plunger or die is covered with a coating of polytrifluorochloroethylene. The tendency to adhere of the $KO_2$ renders difficult the production of shapes, the curvature of which is very considerable.

The $KO_2$ compositions as thus processed are particularly suitable for filling into a cartridge of an element for the regeneration of atmosphere in individual closed circuit respirator apparatus.

It has been noted that the shapes of the pellets according to the invention represent a quasi-ideal compromise between the geometry (i.e. largest surface for smallest volume) and the uniform distribution of the gaseous flow.

A description is given hereinbelow, by way of non-limitative example, of a potassium superoxide cartridge which permits the achievement of extremely good reaction efficiency and optimised performance. The said cartridge may be incorporated for example in an apparatus for individual respiration requiring to be put immediately into operation.

Figure 6:
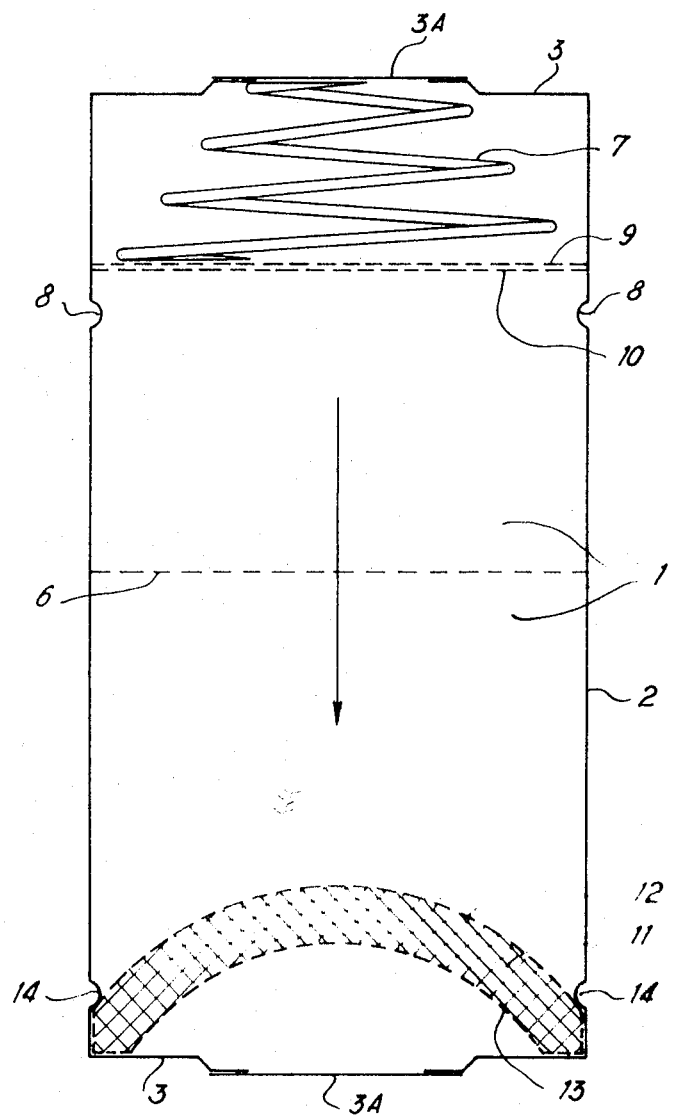

It is shown in FIG. 6 of the accompanying drawings.

The charge of potassium superoxide 1 is lodged in a cylinder made from a material compatible with the potassium superoxide, such as copper, stainless steel or copper-plated steel 2, comprising two end faces 3 fitted by crimping and counter-welded to ensure perfect fluid-tightness.

The end faces are provided with copper foil 3A of small thickness, for example less than 1/10 mm and welded in fluid-tight manner. The said foils are perforated at the instant of utilisation of the cartridge by a device appropriate for enabling immediate putting into operation.

The $KO_2$ charge is comprised of $KO_2$ pellets or "pastilles" having a diameter of 7 to 10 mm. These pellets have a thickness of 4 to 6 mm. They comprise a cylindrical body (4) and two curved end faces having a radius of curvature equal to the diameter of the pellet (5) as shown in FIG. 1 of the accompanying drawings. The pellets are at the minimum potential energy condition; since the cartridge has been filled with vibration in such manner as to achieve maximum compaction, all the pellets contact each other. This configuration makes it possible to obtain punctiform contact between the pellets and to provide between them uniform interstices promoting homogeneous distribution of the gas to be regenerated.

The potassium superoxide charge is fractionated into two or more charges, optionally of equal volume, by means of one or more metallic inserts made from a material compatible with $KO_2$ in the form of a metal gauze or an expanded metal 6. One of the charges is the first in contact with the expired gases to be regenerated.

This arrangement makes it possible to avoid the formation of wide ducts within the $KO_2$ charge during utilisation; such ducts would be followed preferentially by the gas to be regenerated and their presence would diminish the contact between solid and gas and thus the regeneration capacity of the cartridge.

If no particular arrangement were adopted, under the effect of the exothermicity of the chemical reactions and humidity, since the superoxide would tend to soften, the pellets would tend to agglomerate, the volume of the charge would decrease slightly and there would then be formed small "islands" of agglomerated pellets between which large channels would form. The reduction of the volume of the charge and the risk of formation of preferential channels are the more accentuated in proportion as the potassium superoxide charges are smaller.

Means have been found for making it possible to diminish this incidence of the potassium superoxide shrinkage phenomenon which involves a risk of dislodging the charge from the cartridge. These means support the charge at its upper and lower portions.

The said means, which takes the form of a filter comprising two metallic members of curved shape constituting a self-supporting "vault" located at the lower portion of the cartridge and a spring the elongation of which is limited in such manner that the reduction in volume of the charge is controlled and which is disposed in the upper portion of the cartridge, constitute the main features of the potassium superoxide cartridge according to the invention.

In order to minimise the reduction of the volume of the $KO_2$ charge during utilisation, the latter is maintained under the pressure of a spring 7 arranged in the upper portion of the cartridge. In the case of the example, the force developed by the spring is approximately 5 kg/dm². However, in order to prevent excessive compression of the $KO_2$ charge, the elongation of the spring is limited to a value of, for example, 5 to 10 mm by means of a keeper or bead 8. This curved portion 8 is formed in the cylindrical body of the cartridge and on it bears a disc of rigid expanded metal 9 and a fine mesh metal gauze 10 interposed between the $KO_2$ and the spring.

The said spring 7 bears on the $KO_2$ charge through intermediary of two grids the first coarse grid being provided in order to effect uniform distribution of the force exerted by the spring on the entire charge and the fine grid preventing damage to the $KO_2$ pellets.

At its lower portion, the $KO_2$ charge is maintained by a self-supporting "vault" constituted by a filter.

The gas to be regenerated circulates downwardly through the cartridge charged with $KO_2$ pellets. After flowing through the regeneration charge the regenerated gases are filtered by a predetermined thickness of non-combustible mineral fibres 11, such as glass fibres.

According to the invention, there has been discovered a filter which makes it possible to withstand the pressure of the spring and the weight of the $KO_2$ charge without deformation, to increase the gas filtration surface relative to a flat filter and to adjust the thickness and the homogeneous compression of the mineral fibre. The uniform compression of the glass fibres prevents any rupture under the influence of vibrations and consequently any entraiment of these ruptured fibres which would involve a risk of ulceration of the respiratory tract.

This filter, comprising two metal members of curved shape constituting a self-supporting "vault" structure, comprises:

a curved disc 12 of perforated material of high strength formed with apertures of approximately 2 mm. The sheet material is preferably copper plated. The disc 12 comprises a resilient skirt bearing on the cylindrical body of the cartridge. It is furthermore butted on the keeper or bead 14. This bead or curved portion permits the centering of the "vault" structure, facilitating the placing in position thereof and improving the metal-to-metal fluid-tightness. The upper disc 12 is sufficently rigid to bear the weight of the $KO_2$ charge and to withstand the force of the spring;

the filter comprises a further curved disc 13 made from fine-meshed expanded metal, the size of the rhomboids being approximately 1 mm/0.5 mm.

The ends of the said disc bear on the end face of the cartridge.

The gap provided between the two discs is approximately 10 mm in size. The filtering element is lodged in the said gap.

When the filter is placed in position, the empty cartridge is subjected to flushing by compressed air and then the $KO_2$ charge is introduced.

According to a variant of the carrying into effect of the invention, if maximum optimisation of cartridge performance is desired, the reaction between the solid-gas is initiated by disposing at the upper portion of the charge a layer of small thickness, approximately 1 cm, of pellets catalysed by an appropriate catalyst, preferably by copper oxychloride. The said pellets generally have smaller dimensions than the pure $KO_2$ compositions, the diameter ratio being between 7 mm to 9 mm.

It will readily be appreciated that optimisation of all the features of the cartridges should be aimed at, since they are extremely small relative to the very intense work which they are required to do in view of respiratory requirements.

A cartridge designed in accordance with the invention, having a height of 175 mm and a diameter of 70 mm, is charged with 450 g of $KO_2$ distributed in a volume respresented by that of a cylinder having a height of 120 mm and a diameter of 70 mm. It is able to operate "autonomously" for 3 hours in the case of light work performed in a submarine.

What I claim is:

1. A cartridge for the regeneration of expired gases adapted to be incorporated in an individual closed circuit respirator, which contains compacted therein a plurality of pellets in punctiform contact, said pellets being of potassium superoxide and having a many-sided shape having at least three curved surfaces, some of which are convex, obtained by the pelleting-pastilling of potassium superoxide powder.

2. Cartridge for the regeneration of expired gases according to claim 1, wherein the pallets contain between 0.10 and 0.30 percent of copper oxychloride.

3. Cartridge for the regeneration of expired gases adapted to be incorporated in an individual respirator according to claim 1, constituted by a cylindrical body having an upper end and a lower end and made from a material compatible with the potassium superoxide and closed by two fluid-tight end faces and within which the potassium superoxide pellets are lodged, wherein, at the lower end, a self-supporting curved "vault" structure is constituted by a filter supporting thereabove the regeneration charge.

4. Cartridge for the regeneration of expired gases and adapted to be incorporated in an individual respirator according to claim 3, wherein the filter comprises two perforated spaced curved metal elements in the gap between which a filtering element is lodged.

5. Cartridge for the regeneration of expired gases according to claim 3, comprising at its upper end a spring the elongation of which is limited in such manner that the volume of the regeneration charge is controlled.

6. Cartridge for the regeneration of expired gases according to claim 5, comprising a curved portion formed in the cylindrical body of the cartridge and limiting the elongation of the spring, a first metal disc having wide perforations adjacent said spring, and a second metal disc having fine perforations adjacent said first metal disk, said discs being interposed between the pellets and the spring and bearing on the said curved portion; and wherein at least one insert separates the pellets into at least two charges of equal volume; and the filter comprises a first curved metal disc formed with wide perforations, butting on a curved portion formed in the cylindrical body at the lower end thereof, and a further curved metal disc spaced from said first curved metal disc and formed with fine perforations;

further wherein the end faces of the cartridge are provided with thin foils.

7. Cartridge for the regeneration of expired gases according to claim 6, wherein the metal disc having wide perforations is a disc of expanded metal and the metal disc having fine perforations is a fine mesh metal gauze.

8. A cartridge for the regeneration of expired gases according to claim 1, wherein the potassium superoxide pellets are in the form of pellets-pastilles comprising a cylindrical body and two curved end faces, the radius of curvature of which is substantially equal to the diameter of the pellet.

9. A cartridge for the regeneration of expired gases according to claim 8, wherein the porosity of the compositions based on potassium superoxide ranges is between 40 and 50 percent.

10. A cartridge for the renegeration of expired gases according to claim 9, wherein the compositions based on potassium superoxide are obtained by the compression of a potassium superoxide powder under a relative pressure of 80 to 120 $kg/cm^2$.

* * * * *